US008780139B2

(12) United States Patent
Murata

(10) Patent No.: US 8,780,139 B2
(45) Date of Patent: Jul. 15, 2014

(54) RESOLUTION MONITORING WHEN USING VISUAL MANIPULATION TOOLS

(75) Inventor: Robert Murata, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 961 days.

(21) Appl. No.: 11/389,759

(22) Filed: Mar. 27, 2006

(65) Prior Publication Data

US 2013/0125039 A1    May 16, 2013

(51) Int. Cl.
*G09G 5/00* (2006.01)

(52) U.S. Cl.
USPC ........... 345/661; 345/619; 345/646; 345/660; 715/700

(58) Field of Classification Search
USPC ........................................... 358/1.2; 345/619
See application file for complete search history.

(56) References Cited

U.S. PATENT DOCUMENTS

| | | |
|---|---|---|
| 6,741,270 B1 | 5/2004 | Rzepkowski et al. |
| 6,947,061 B2 | 9/2005 | Van Epps |
| 6,993,169 B2 | 1/2006 | Wetzel et al. |
| 7,363,583 B1 * | 4/2008 | Costa ............................ 715/734 |
| 2002/0063905 A1 | 5/2002 | Hsu et al. |
| 2002/0186382 A1 * | 12/2002 | Gonzalez et al. ............... 358/1.2 |
| 2002/0191027 A1 * | 12/2002 | Morrow et al. ............... 345/788 |
| 2003/0009773 A1 | 1/2003 | Carlson |
| 2004/0117735 A1 * | 6/2004 | Breen .......................... 715/517 |
| 2004/0125138 A1 * | 7/2004 | Jetha et al. ...................... 345/764 |
| 2004/0239982 A1 * | 12/2004 | Gignac ........................ 358/1.15 |
| 2004/0252340 A1 * | 12/2004 | Komagamine et al. ....... 358/1.18 |
| 2005/0007382 A1 * | 1/2005 | Schowtka ..................... 345/619 |
| 2005/0094207 A1 * | 5/2005 | Lo et al. ........................ 358/1.18 |
| 2005/0104897 A1 * | 5/2005 | Walker et al. ................. 345/620 |
| 2006/0126082 A1 | 6/2006 | Choi |
| 2006/0129944 A1 * | 6/2006 | Berquist et al. ............... 715/764 |
| 2006/0197963 A1 * | 9/2006 | Royal et al. .................... 358/1.2 |
| 2006/0215232 A1 | 9/2006 | Ziv-el |

* cited by examiner

*Primary Examiner* — Phi Hoang
(74) *Attorney, Agent, or Firm* — Wolfe-SBMC

(57) ABSTRACT

Resolution monitoring when using visual manipulation tools is described, including determining a minimum resolution for a visual manipulation tool, monitoring a usage of the visual manipulation tool, and interrupting the usage of the visual manipulation tool if the visual manipulation tool is operating below the minimum resolution.

21 Claims, 7 Drawing Sheets

RESOLUTION MONITORING WHEN USING VISUAL MANIPULATION TOOLS

FIELD OF THE INVENTION

The present invention relates generally to software. More specifically, resolution monitoring when using visual manipulation tools is described.

BACKGROUND OF THE INVENTION

Imaging software, such as Photoshop® by Adobe Systems Incorporated of San Jose, Calif., is a type of software used to view or manipulate digital images. Imaging software is typically presented in a windowed graphical user interface (GUI) environment on a computer system display. Imaging software displays a digital image that can then be manipulated by a user. Some types of manipulations that a user may perform include resizing an image, cropping an image, color correcting an image, and adding text to an image. Image editing software may include various tools that can be used to perform these manipulations. For example, a crop tool can be used to crop an image.

Digital images comprise a number of picture elements (pixels), typically arranged in a rectangular grid. The dimensions of a digital image may be given as the width of the image (in pixels) by the height of the image (in pixels). A digital image can be printed using one of several types of printers. When the digital image is printed, the image may be resized to fit a particular paper size. For example, an image may be printed on a six inch by four inch sheet of paper. If the digital image has a resolution of 900 pixels by 600 pixels, then the resolution of the printed image is 150 dots per inch (dpi). The resolution can be determined by dividing the number of pixels (i.e., dots) in a dimension by the physical size of that dimension (e.g., 900 pixels divided by six inches gives 150 dpi).

A crop tool can be used to select a portion of an image and discard the remainder. A crop tool may include a rectangular selection tool that can be dragged using a mouse or other pointing device. After the original image has been cropped, the resulting image has a reduced pixel count compared to the original image.

A printer typically produces lower quality output when the resolution of the source image is reduced. For a specific printer there may be a resolution below which the printed output is deemed unacceptable to a user of that printer. For example, a user may have determined that any image having a resolution below 150 dpi produces unacceptable printed images. A cropped image may have discarded so much of the original image data that it may result in an unacceptable printed image when the original image had enough image data to produce an acceptable image.

Thus, what is needed is resolution monitoring when using visual manipulation tools without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to various embodiments of the invention, resolution monitoring when using visual manipulation tools is described. Image editing software or any other software that uses visual manipulation tools may include a specifiable minimum resolution. When a visual manipulation tool is operated below this minimum resolution, the visual manipulation tool is interrupted. The tool may be interrupted by preventing the tool from operating below the minimum resolution or by issuing a warning that the tool is being operated below the minimum resolution.

Minimum Resolution Notification

Figure 1A:
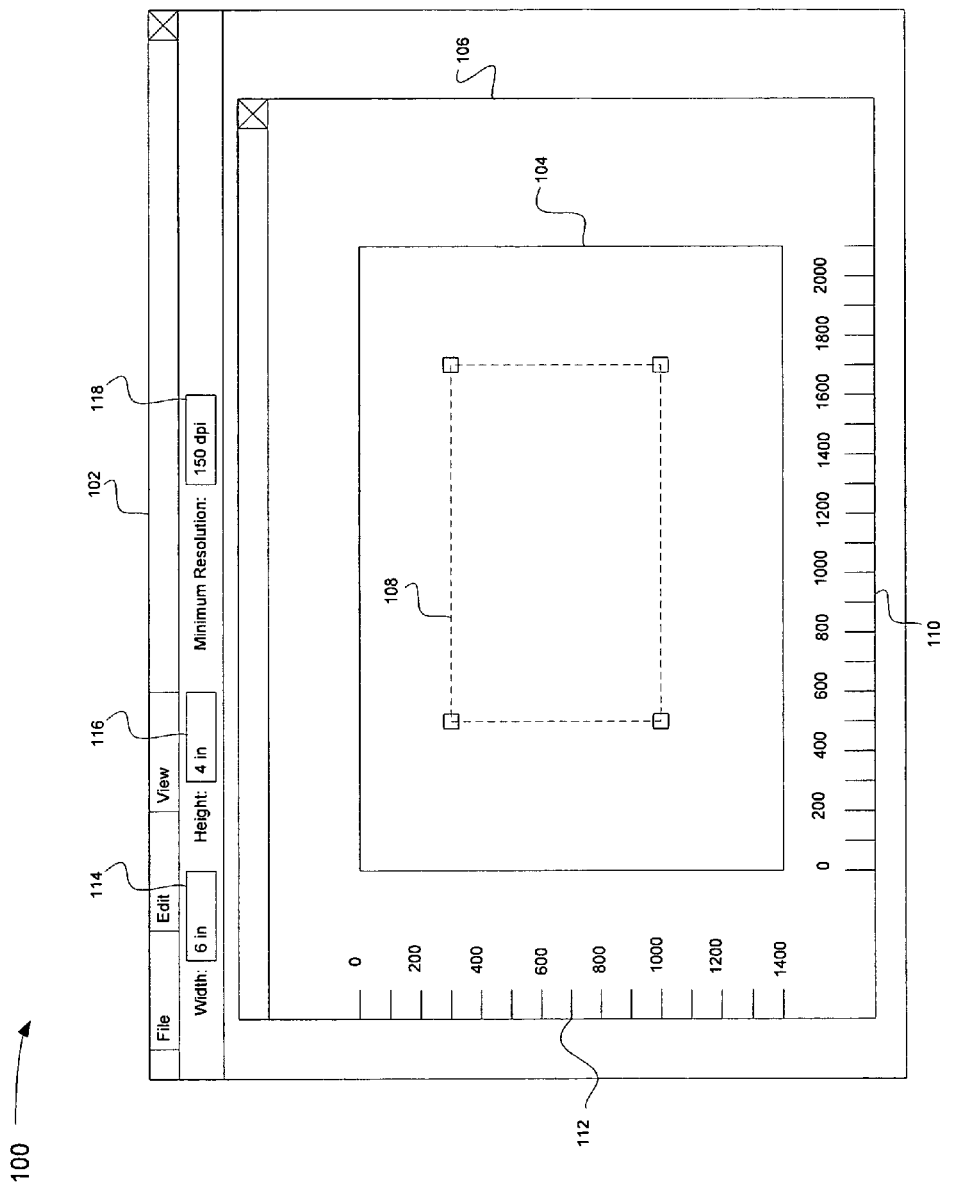
FIG. 1A illustrates exemplary image editing software in accordance with an embodiment.

FIG. 1A illustrates exemplary image editing software in accordance with an embodiment. The image editing software 100 is displayed in a main window 102 and is operating on an image 104, which is displayed within a sub-window 106. A visual modification tool such as a crop tool 108 is operating on the image 104. The sub-window 106 includes an x-axis ruler 110 and a y-axis ruler 112 that can be used to demonstrate a current size of the crop tool 108.

A visual manipulation tool is a tool that can be used to modify the appearance of an image (such as the image 104) or other visual media. Several different types of visual manipulation tools may be used, including the crop tool 108, an image clone tool, zoom tools, panning tools, and painting tools. The operations of tools other than the crop tool 108 are described below. The crop tool 108 may be used to designate a portion of the image 104 to retain; the remainder is discarded.

The main window 102 includes three data entry fields. The first data entry field 114 is for the desired image width, the second data entry field 116 is for desired image height, and the third data entry field 118 is for the minimum resolution. According to an embodiment, a user of the image editing software 100 may want to specify a certain size and minimum resolution of a cropped image. Alternatively, the image editing software 100 or another routine may determine the entries for these fields. For example, a user may want to specify a minimum resolution of a resulting cropped image to obtain satisfactory printed images. The user may also want to specify an image size that he wishes to use when printing the image.

For example, the user desires a printed image having a width of six inches and a height of four inches. The user has entered six inches into the data entry field 114 and four inches into the data entry field 116. The user also knows that in order to produce an acceptable printed output that the minimum resolution of the resulting cropped image should be at least 150 dots per inch (dpi). The user has therefore entered 150 dpi into the third data entry field 118. According to an embodiment, since the resolution of the crop tool 108 is monitored, when the image 104 is cropped, the resulting image has the dimensions given in the data entry fields 114 and 116, and at minimum the resolution as indicated in the data entry field 118. Although dpi is specified here, it is understood that any appropriate measurement of resolution may be used.

As shown in FIG. 1A, the image 104 has a width of 2100 pixels and a height of 1400 pixels. Since, according to this example, the user desires a four inch by six inch cropped image with a minimum resolution of 150 dpi, a first minimum dimension corresponding to the minimum width of 900 pixels and a second minimum dimension corresponding to the minimum height of 600 pixels are determined. According to an embodiment, if the crop tool 108 operates below both minimum dimensions, the usage of the crop tool (or other visual manipulation tool) is interrupted. According to another embodiment, the usage of the crop tool (or other visual manipulation tool) may be interrupted if the crop tool is operated below either of the minimum dimensions.

As shown in FIG. 1A, the crop tool 108 currently has a width of 1200 pixels and a height of 700 pixels. If operated in this manner, when a crop is executed, the resulting cropped image has a higher resolution than the minimum resolution of 150 dpi and may not have the exact dimensions of six inches wide by four inches high, since the current size of the crop tool 108 has a different aspect ratio than the desired image sizes given in the data entry fields 114 and 116. The resulting cropped image may not occupy the entire desired image size, but the image has satisfactory resolution over the portion of the desired image size which it occupies.

Figure 1B:
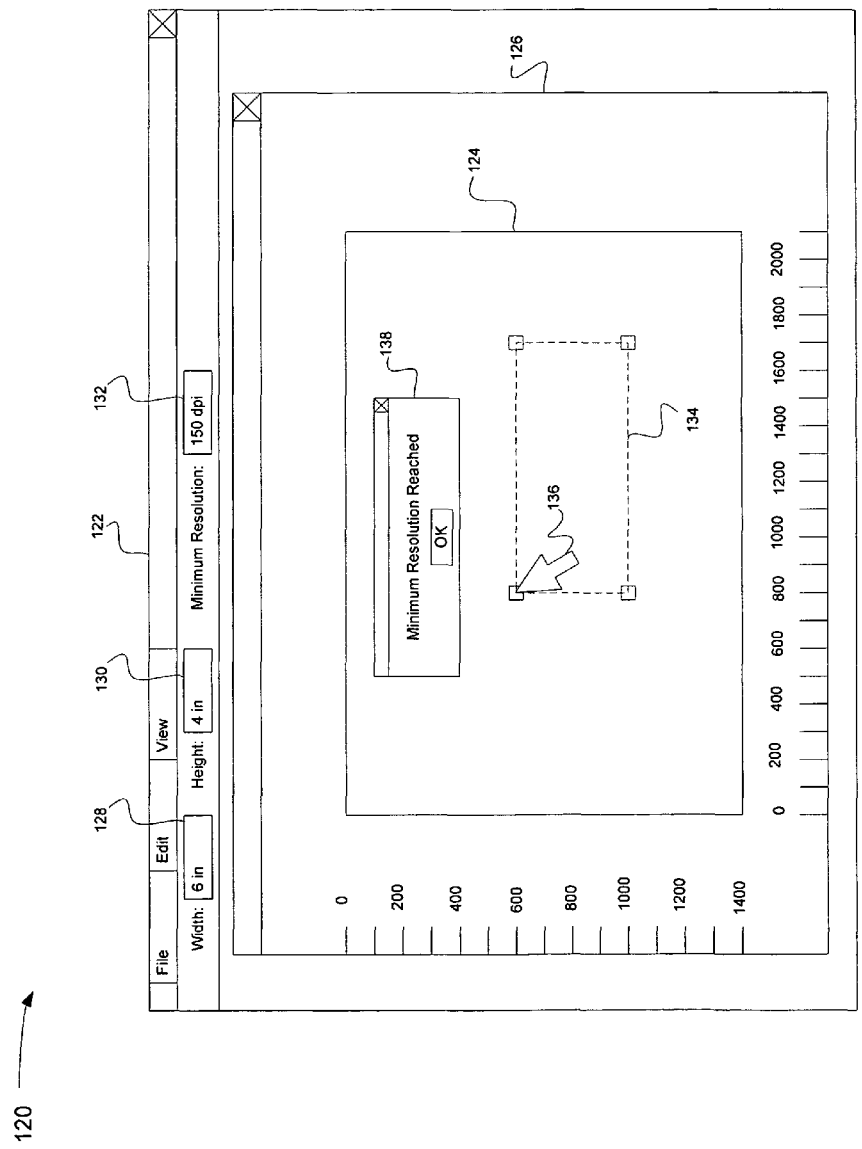
FIG. 1B illustrates image editing software including a crop tool operating below a minimum resolution according to an embodiment.

FIG. 1B illustrates image editing software including a crop tool operating below a minimum resolution according to an embodiment. The image editing software 120, like the image editing software 100, includes a main window 122, an image 124 inside a sub-window 126, a first data entry field 128 for a desired image width, a second data entry field 130 for a desired image height, and a third data entry field 132 for a desired minimum resolution. A crop tool 134 is being operated on by a pointer 136.

The pointer 136 is controlled by a mouse or other cursor control device. The image editing software 100 monitors the size of the crop tool 134. The image editing software 100 also determines a first minimum dimension and a second minimum dimension of the crop tool 134. As described above, the first minimum dimension may be determined by multiplying the desired image width by the minimum resolution, and the second minimum dimension may be determined by multiplying the desired image height by the minimum resolution. When the pointer 136 drags the crop tool 134 below both the first minimum dimension and the second minimum dimension, a warning 138 is issued.

As shown in FIG. 1B, the crop tool 134 has a height less than the second minimum dimension (i.e., less than 600 pixels), and the width has reached the first minimum dimension (i.e. 900 pixels). When the width of the crop tool reaches the first minimum dimension, the usage of the crop tool 134 is interrupted and the warning 138 is issued. The user may ignore the warning 138 and continue cropping the image 124 below the minimum resolution or the user may choose to heed the warning and maintain or enlarge the crop tool 134.

Alternatively, if the width of the crop tool 134 was below the first minimum dimension, and the height of the crop tool 134 reached the second minimum dimension, the warning 138 could also be issued. Further, the warning 138 may also be issued if either of the width or the height of the crop tool 134 fall below the first minimum dimension or the second minimum dimension, respectively.

Several other techniques for warning a user of image editing software such as the image editing software 100 and 120 are possible. For example, an audio notification, such as an audio tone or spoken message, may be used to notify the user that the minimum resolution has been reached. A visual notification may include a tinted crop tool. For example, the crop tool may include a red tint to indicate that a minimum resolution has been reached. A tactile notification, such as a vibrating mouse or other pointing device can also notify a user that a minimum resolution has been reached. Other types of notifications are also possible, such as an olfactory or taste notification, and may be incorporated into image editing software to provide notification.

Figure 1C:
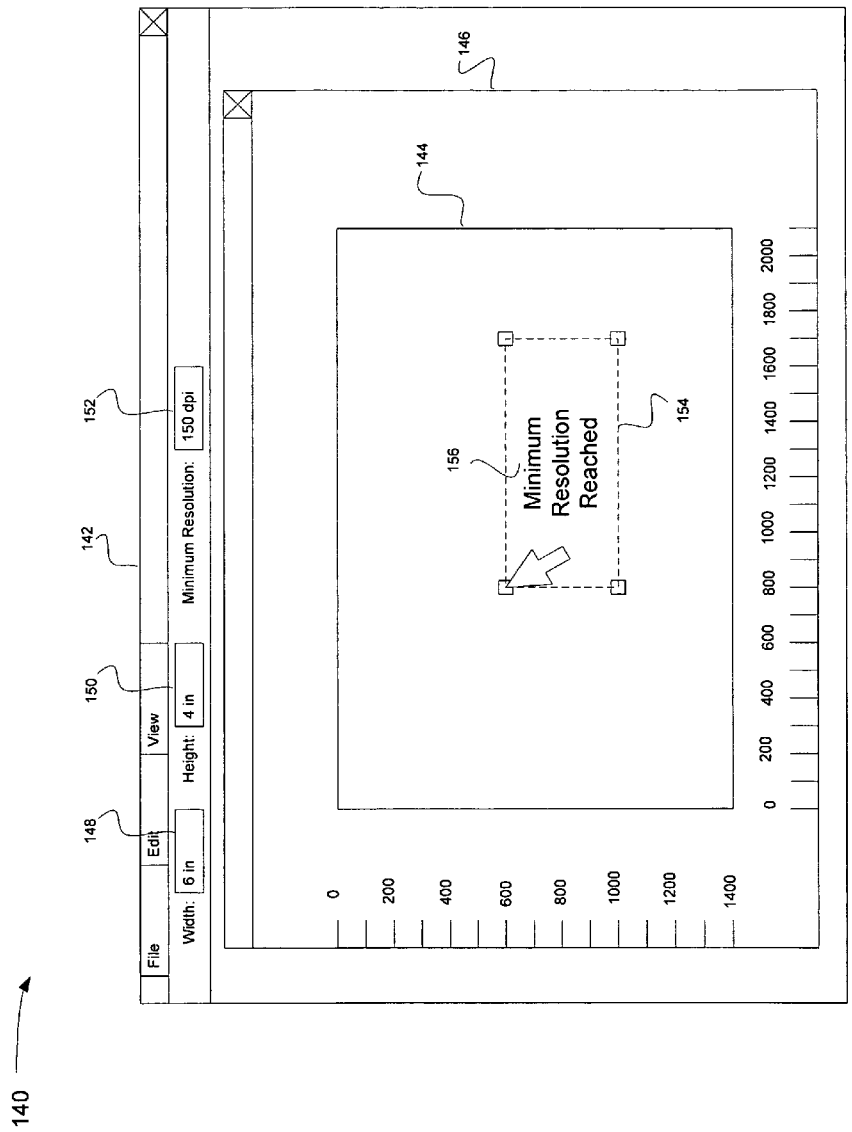
FIG. 1C illustrates image editing software preventing a crop tool from operating below a minimum resolution according to an embodiment.

FIG. 1C illustrates image editing software preventing a crop tool from operating below a minimum resolution according to an embodiment. A crop tool may be prevented from operating below a specified minimum resolution. That is, as soon as the crop tool reaches either or both of the first and second minimum dimensions, a user is unable to continue reducing the size of the crop tool.

Image editing software 140, like the image editing software 100 and the image editing software 120, operates in a main window 142 and includes an image 144 in a sub-window 146, a first data entry field 148 for a desired image width, a second data entry field 150 for a desired image height, and a third data entry field 152 for a desired minimum resolution. A crop tool 154, as shown, has reached one of the minimum dimensions (and thus, the minimum resolution) and has been prevented from shrinking any further. A notice 156 (e.g., a dialog box), noting that the minimum resolution has been reached, may be displayed in or over the crop tool 154. The notice 156 may have a colored background and may be accompanied by audio tones or other notifications that the minimum resolution has been reached.

Although the various crop tools shown in FIGS. 1A-1C use a rectangular selection area, it is understood that other selection area may be used with various embodiments. For example, a circular, triangular, star-shaped, or other selection area may be used with the various embodiments described above.

According to an embodiment, the crop tool may also be a fixed-aspect ratio crop tool. A fixed-aspect ratio crop tool is used to produce a cropped image of a given size, for example an image having the image width specified in the data entry field 148 and the image height specified in the data entry field 150. When the fixed-aspect ratio crop tool is used, the ratio between the width and the height of the tool remains constant, and the resulting cropped image has the specified height and width. In this case, for example, the crop tool may be interrupted when it reaches the dimensions specified in the three data entry fields 148, 150, and 152. Using the numbers shown in the data entry fields 148, 150, and 152, the fixed-ratio crop tool is interrupted when it reaches the size of 900 pixels wide and 600 pixels high.

The use of the crop tool as described above in the various examples can also be modified for use with multi-layer images. A multi-layer image includes two or more layers of image data, each of which may have a different resolution. Using a multi-layer image, for example, a user or the image editing software can specify that the layer having the lowest resolution is used to determine the minimum resolution for use with resolution monitoring. The determination of the minimum resolution can be based on any layer of a multi-layer image. For example, a user may specify a specific layer to monitor (e.g., layer three), the lowest resolution layer, the highest resolution layer, or an average of the resolutions of all of the layers.

Alternatively, according to an embodiment, a multi-layer image may include some layers having image data over only a portion of the layer. If, for example, a two-layer image has a low-resolution layer and a high-resolution layer, and the low-resolution layer includes image data over a portion of the layer, if the crop tool is activated over the portion in which the low-resolution layer includes image data, then according to an embodiment the resolution is limited by the low-resolution layer. If, however, the crop tool is activated over the portion of the image where the low-resolution layer has no image data, then the resolution may be limited by the high-resolution layer.

Although a crop tool is described in the examples given above, it is understood that a minimum resolution may also be monitored for other visual manipulation tools. For example, a clone tool can be used to select an area of an image, and draw a copy of the area selected at another area in the image (or within another image). The target of the clone tool can be scaled to a larger size than the original selected area. The resolution monitoring can be used to ensure that the output of the clone tool is satisfactory. The minimum resolution can be compared to the resolution of the clone tool. For example, if the resolution of the original area is 200 dpi, and the clone tool doubles the size of the original, the target area would output at 100 dpi. The image editing software could then interrupt the operation of the clone tool by issuing a warning or preventing the use of the clone tool.

Figure 1D:
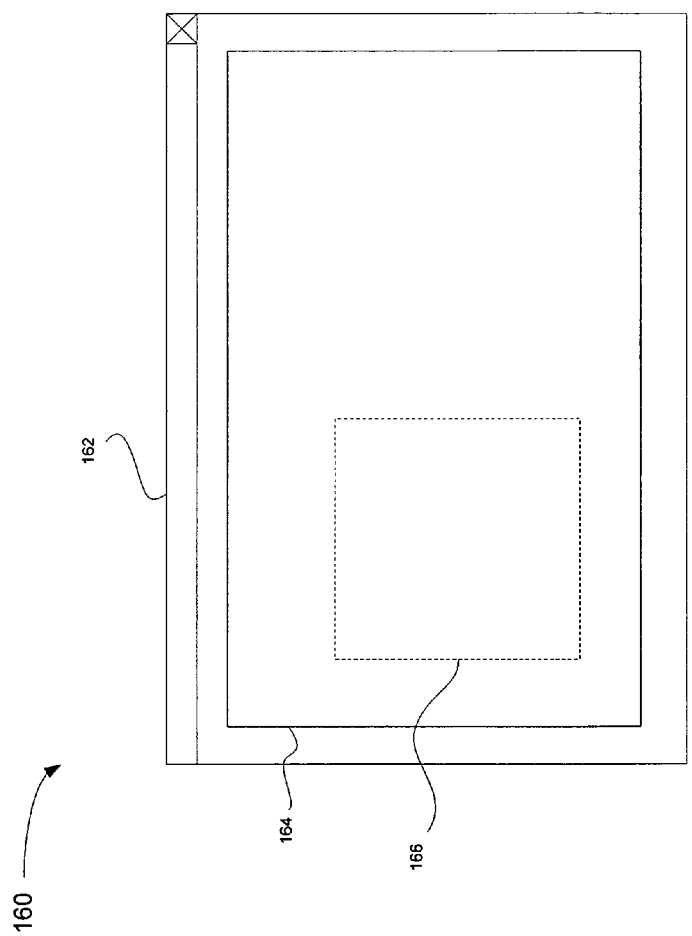
FIG. 1D illustrates resolution monitoring using video editing software according to an embodiment.

Although image editing software is described above, it is understood that embodiments may be used with other devices and software. FIG. 1D illustrates resolution monitoring using video editing software according to an embodiment. Video editing software 160 displays information and data in a main window 162 and is operating on a video 164. A resize tool 166 is a type of visual manipulation tool used to select an area of the video 164 for resizing or zooming in to.

The video editing software 160 may prevent a user from zooming too far into an image. Similar to the crop tool, once the resize tool 166 reaches a minimum resolution, the video editor may interrupt the usage of the resize tool 166, either by preventing further resizing or zooming or by issuing a warning. The minimum resolution may be selected by a user or through another routine. If the area chosen using the resize tool 166 lacks sufficient image data to display at the desired output size (e.g., the entire video window), the video editing software 160 may interrupt the usage of the resize tool 166. Other types of video editing devices, including standalone devices may also be used with various embodiments.

Processes for Issuing Minimum Resolution Notification

Figure 2A:
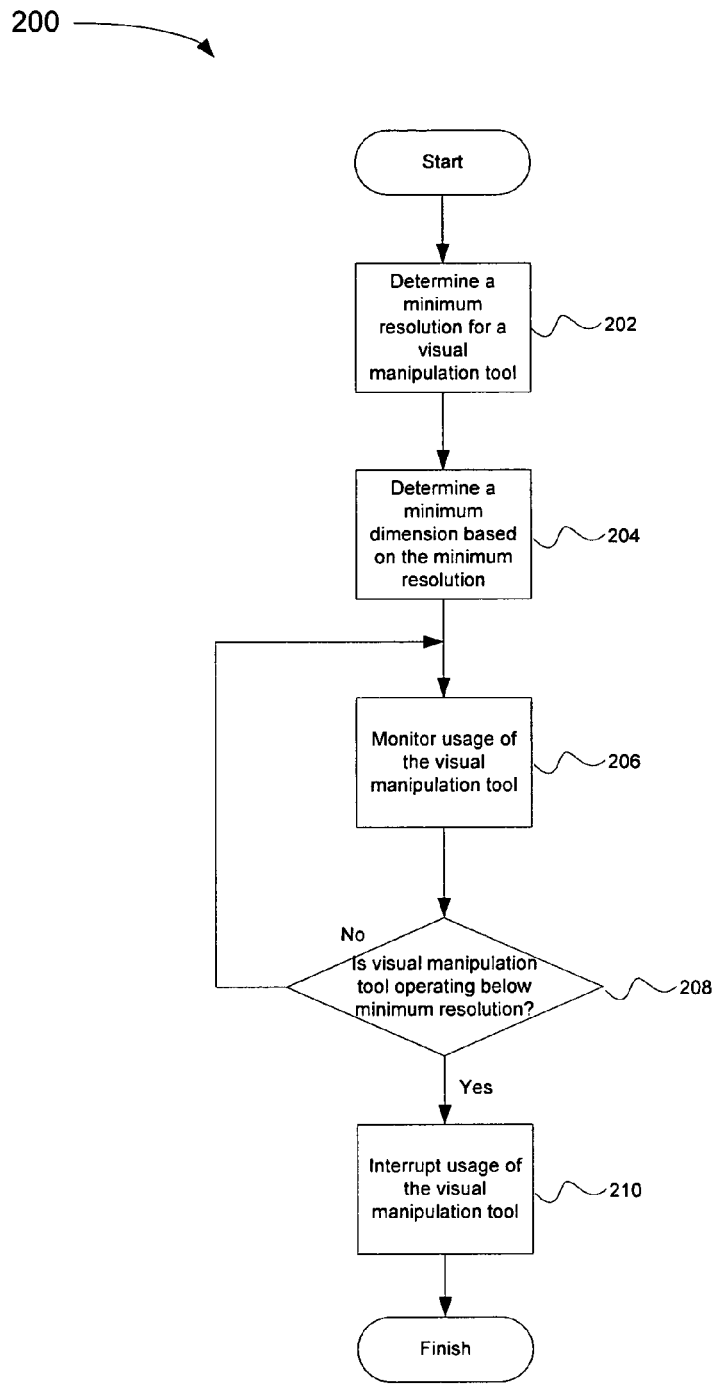
FIG. 2A describes a process for determining whether a visual manipulation tool is operating below a minimum resolution and interrupting the visual manipulation tool if it is operating below the minimum resolution according to an embodiment.

FIG. 2A describes a process 200 for determining whether a visual manipulation tool is operating below a minimum resolution and interrupting the visual manipulation tool if it is operating below the minimum resolution, according to an embodiment. The process 200 uses input data specified by a user or specified by a routine or other set of instructions. For example, the process 200 may use the data in the data entry fields 114-118.

In block 202, a minimum resolution for a visual modification tool is determined. A visual modification tool may be any tool used to alter an image or other visual media. For example, a crop tool can be used to select an area of an image or a resize tool can be used to select an area of a video. The minimum resolution may be given by a user, for example in the data entry field 118, or otherwise specified by program defaults or other routines. When manipulating a multi-layer image, the determination of the minimum resolution may be based on a layer of the multi-layer image, as described above. By determining the minimum resolution, the process 200 determines what minimum resolution has been specified.

In block 204, a minimum dimension based on the minimum resolution is determined. The minimum dimension may be used by certain tools to implement the process 200. The minimum dimension may be given in pixels and may be determined by multiplying an image size by the minimum resolution. The image size may be given in, for example, the data entry fields 114 or 116. If the image size is six inches and the minimum resolution is 150 dpi, then the minimum dimension would by 900 pixels. According to certain embodiments, multiple minimum dimensions may be determined. For example, with an image, a minimum dimension for the width of the image and a minimum dimension for the height of the image may be determined.

In block 206, the usage of the visual manipulation tool is monitored. For example, a size of a crop tool can be altered by a user using a mouse or other pointer. When the size of the visual manipulation tool is changed, the resulting size is monitored by the process 200. The process 200 may also monitor the current level of zoom on a resize tool or the amount of scaling used with a clone tool.

In block 208, if the visual manipulation tool is operating below the minimum resolution, the process continues to block 210. A visual manipulation tool is operating below the minimum resolution if the resulting image or other visual media resulting from the operation of the tool would have a resolution below the minimum resolution. If the visual manipulation tool is not operating below the minimum resolution, the process 200 continues monitoring the usage in block 206. The process 200 may determine in block 208 that the visual manipulation tool is operating below its minimum resolution by comparing the current size of the visual manipulation tool with the minimum dimension determined in block 204. In some cases there may be a first minimum dimension and a second minimum dimension of the tool. The process 200 may determine that the visual manipulation tool is operating below the minimum resolution if one or both of the minimum resolutions have been exceeded.

In block 210, usage of the visual manipulation tool is interrupted if the visual manipulation tool is operating below its minimum resolution. The interruption may comprise the process 200 preventing the visual manipulation tool from operating below its minimum resolution (e.g., preventing a user from reducing the size of the visual manipulation tool any further). Alternatively, the process 200 may warn a user that the minimum resolution has been reached. The warning, as described above may comprise any type of warning including a visual notification, an audio notification, or a tactile notification.

Figure 2B:
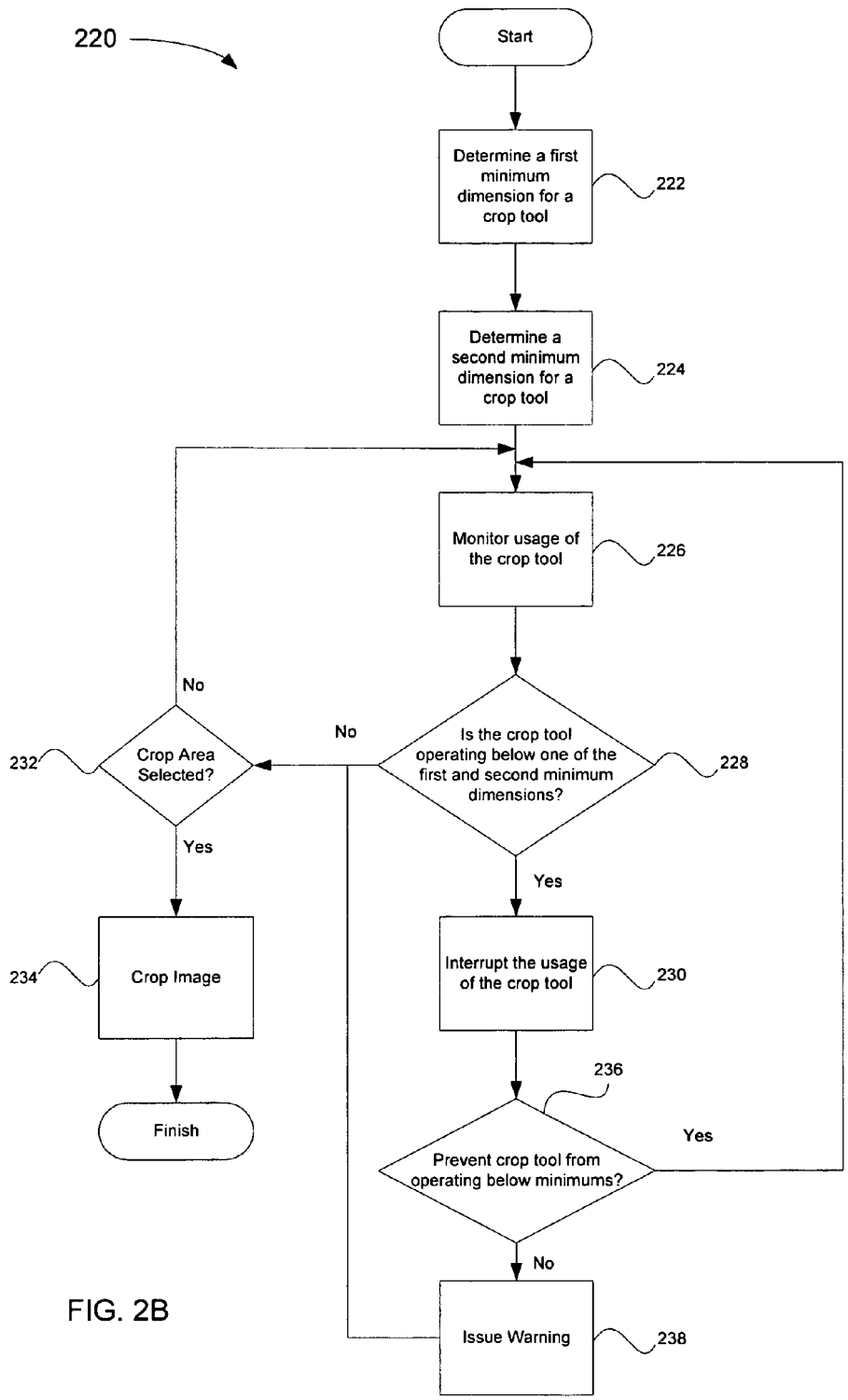
FIG. 2B is a flowchart describing a process for cropping an image while monitoring a minimum resolution for the crop tool according to an embodiment.

FIG. 2B is a flowchart describing a process 220 for cropping an image while monitoring a minimum resolution for the crop tool according to an embodiment. The process 220 describes the use of a rectangular crop tool that has a width and a height. It is understood that various other crop selection tools, such as those using circular selection areas, are possible using this process.

In block 222, a first minimum dimension for the crop tool is determined. The first minimum dimension may be, for example, the minimum width (in pixels) of the crop tool. In block 224, a second minimum dimension for the crop tool is determined. The second minimum dimension may be, for example, the minimum height (in pixels) of the crop tool. As explained above, the minimum dimensions may be determined by multiplying the desired image size by the minimum resolution. For example, if the desired image size is six inches wide by four inches high and the desired minimum resolution is 150 dpi, then the first minimum dimension may be 900 pixels (six inches times 150 dpi) and the second minimum dimension may be 600 pixels (four inches times 150 dpi).

In block 226, the usage of the crop tool is monitored. The size of the crop tool is monitored to determine whether the dimensions of the crop tool have fallen beneath the minimum dimensions determined in blocks 222 and 224. In block 228 it is determined whether the crop tool is operating below one of the first and second minimum dimensions. If the crop tool is not operating below the minimum dimensions, it is determined in block 232 whether a user has selected the cropped area to perform the crop. According to an embodiment, a user may indicate that they have selected the cropped area by clicking or double-clicking the selected area or performing a keystroke (e.g., by pressing the 'Enter' key). If the user has selected the cropped area, in block 234 the image is cropped. If the user has not selected the cropped area, the process 220 returns to block 226 where the crop tool continues to be monitored.

According to various embodiments, block 228 may be true if the crop tool becomes smaller than one of the minimum dimensions or both of the minimum dimensions. A user setting in the image editing software may be set for one of these two cases according to an embodiment. Where the usage of the crop tool is interrupted when both minimum dimensions are exceeded, a user may wish to fill a portion of a printed page. For example, the user may wish to fill the width of the printed page (e.g., six inches), while the height of the printed image is something less than four inches. In this case, with a minimum resolution of 150 dpi, the crop tool would be interrupted when both the height of the cropped image would be less than 600 pixels and the width of the tool would be less than 900 pixels.

In block 230, the usage of the crop tool is interrupted if the crop tool is operating below the minimum dimensions as determined in block 228. In block 236, it is determined whether the process 220 prevents the crop tool from operating below one or both of the minimum dimensions. As mentioned above, either the crop tool may be prevented from operating below the minimum dimensions or a warning may be issued. If the crop tool is prevented from operating below the minimum dimensions, the crop tool does not reduce the image, a notice (e.g., the notice 156) is generated, and monitoring is continued in block 226. If the crop tool is not prevented from operating below the minimum dimensions, the process 220 continues to block 238, where a warning is issued, and onto block 232, where it is determined whether a crop has been selected. In this case, the selected crop may reflect that the crop tool is operating below the minimum dimensions.

An Exemplary Computer System

Figure 3:
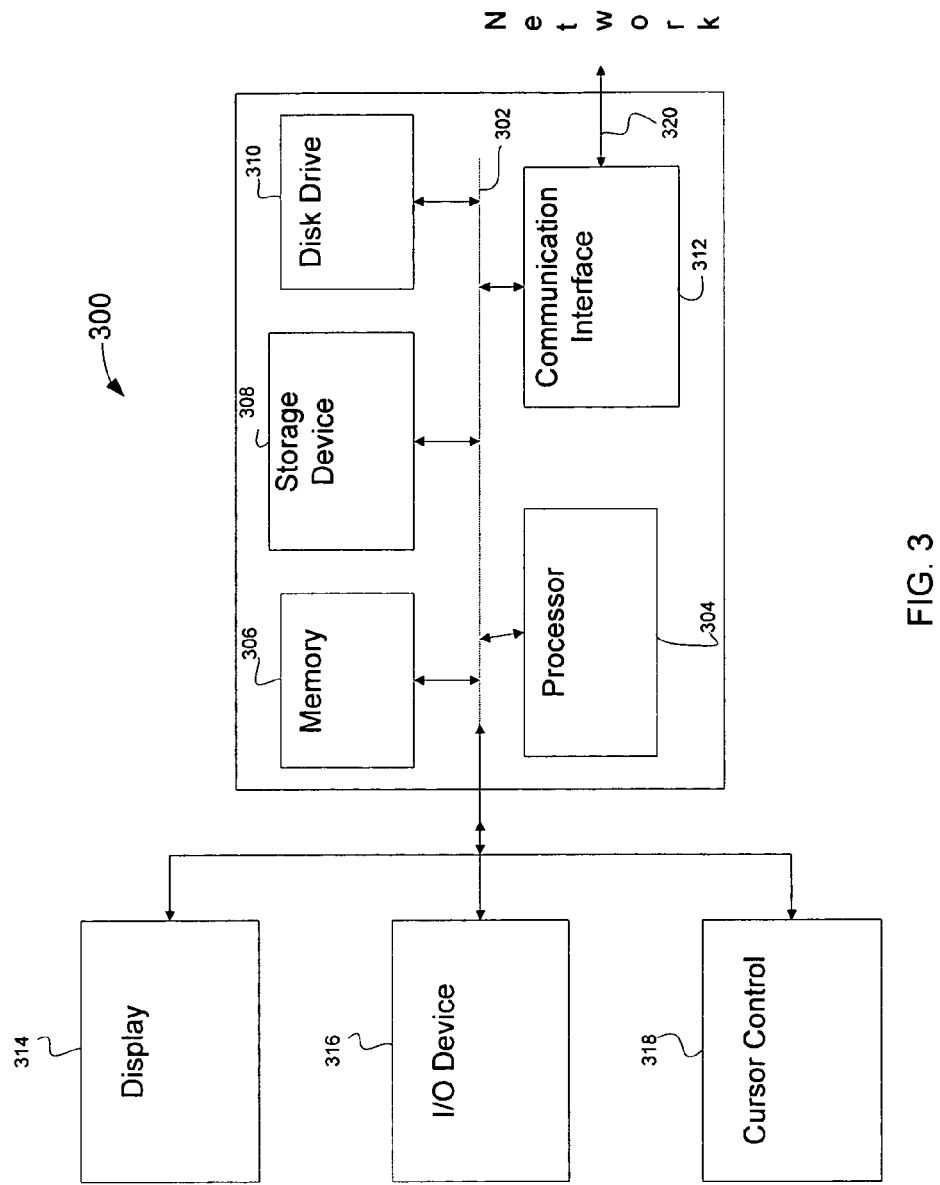
FIG. 3 is a block diagram illustrating an exemplary computer system suitable for visually representing characteristics of an object in a space, in accordance with various embodiments of the invention.

FIG. 3 is a block diagram illustrating an exemplary computer system suitable for visually representing characteristics of an object in a space, in accordance with various embodiments of the invention. In some embodiments, a computer system 300 may be used to implement computer programs, applications, methods, processes, or other software to perform the above-described techniques. The computer system 300 includes a bus 302 or other communication mechanism for communicating information, which interconnects subsystems and devices, such as a processor 304, a system memory 306 (e.g., RAM), a storage device 308 (e.g., ROM), a disk drive 310 (e.g., magnetic or optical), a communication interface 312 (e.g., modem or Ethernet card), a display 314 (e.g., CRT or LCD), an input device 316 (e.g., keyboard), and a cursor control 318 (e.g., mouse or trackball).

According to some embodiments of the invention, the computer system 300 performs specific operations by processor 304 executing one or more sequences of one or more instructions stored in the system memory 306. Such instructions may be read into the system memory 306 from another computer readable medium, such as the static storage device 308 or the disk drive 310. In some embodiments, hard-wired circuitry may be used in place of or in combination with software instructions to implement the invention.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method, comprising:
 performing, by a computer:
  presenting a graphical user interface that enables manipulating an image via a visual manipulation tool, an area of the visual manipulation tool being changeable by a user such that a change to the area of the visual manipulation tool changes a resolution of the visual manipulation tool, the image including multiple layers each having a different resolution one to another;
  determining a minimum resolution for the visual manipulation tool based, at least in part, on one or more of the multiple layers;
  monitoring the resolution of the visual manipulation tool responsive to a change in the area of the visual manipulation tool, the monitoring including monitoring a resolution of at least one of the multiple layers;
  comparing the monitored resolution of the visual manipulation tool to the determined minimum resolution;
  in response to the resolution of the visual manipulation tool being less than the determined minimum resolution, interrupting operation of the visual manipulation tool; and
  in response to the resolution of the visual manipulation tool being equal or greater than the determined minimum resolution, enabling further operation of the visual manipulation tool.

2. The method of claim 1, wherein the interrupting comprises preventing the visual manipulation tool from operating below the determined minimum resolution.

3. The method of claim 1, wherein the interrupting comprises issuing a warning that the visual manipulation tool is operating below the determined minimum resolution.

4. The method of claim 3, wherein the issuing the warning is chosen from the group consisting of performing a visual notification, performing an audio notification, and performing a tactile notification.

5. The method of claim 1, further comprising:
determining a first minimum dimension by multiplying a first desired image size by the determined minimum resolution;
determining a second minimum dimension perpendicular to the first minimum dimension by multiplying a second desired image size by the determined minimum resolution; and
wherein interrupting the visual manipulation tool comprises interrupting the visual manipulation tool if the size of the selection area reaches one of the first minimum dimension or the second minimum dimension.

6. The method of claim 1, further comprising:
determining a first minimum dimension by multiplying a first desired image size by the determined minimum resolution;
determining a second minimum dimension perpendicular to the first minimum dimension by multiplying a second desired image size by the determined minimum resolution; and
wherein interrupting the visual manipulation tool com interrupting the visual manipulation tool if the size of the selection area reaches both the first minimum dimension and the second minimum dimension.

7. The method of claim 1, wherein the visual manipulation tool is a crop tool.

8. The method of claim 1, the monitoring including monitoring two or more of the multiple layers.

9. A method, comprising:
performing, by a computer:
determining a first minimum dimension for a crop tool in a graphical user interface dependent on a first user input received via a first entry data field in the same graphical user interface, the crop tool enabling selection of a portion of an image displayed in the graphical user interface, the image including multiple layers each having a different resolution one to another;
determining a second minimum dimension for the crop tool in the graphical user interface dependent on a second user input received via a second entry data field in the same graphical user interface;
determining a minimum resolution for the crop tool dependent on a third user input received via a third entry data field in the same graphical user interface;
monitoring a first dimension, a second dimension, and a resolution of the crop tool responsive to a change in a size of the crop tool, the monitoring the resolution of the crop tool including monitoring a resolution of at least one of the multiple layers;
in response to the resolution of the crop tool being below the minimum resolution, interrupting usage of the crop tool; and
in response to the resolution of the crop tool not being below the minimum resolution and in response to one of the first dimension of the crop tool being below the first minimum dimension or the second dimension of the crop tool being below the second minimum dimension, enabling usage of the crop tool.

10. The method of claim 9, wherein the interrupting comprises preventing the crop tool from operating below the first minimum dimension or the second minimum dimension.

11. The method of claim 9, wherein the interrupting comprises issuing a warning that the crop tool is operating below the first minimum dimension or the second minimum dimension.

12. The method of claim 9, wherein the interrupting comprises interrupting the usage of the crop tool responsive to the size of the crop tool reaching the first minimum dimension or the second minimum dimension.

13. A system, comprising:
a processor; and
a memory comprising instructions, wherein the instructions are executable by the processor to:
present a graphical user interface that enables manipulating an image via a visual manipulation tool, an area of the visual manipulation tool being changeable by a user such that a change to the area of the visual manipulation tool changes a resolution of the visual manipulation tool, the image including multiple layers each having a different resolution one to another;
determine a minimum resolution for the visual manipulation tool based, at least in part, on an input by the user via the graphical user interface;
receive an indication to monitor:
a first resolution associated with a first layer of the multiple layers;
a second resolution associated with a second layer of the multiple layers; or
both the first resolution associated with the first layer and the second resolution associated with the second layer;
monitor the resolution of the visual manipulation tool responsive to a change in the area of the visual manipulation tool and according to the received indication;
compare the monitored resolution of the visual manipulation tool to the determined minimum resolution;
in response to the resolution of the visual manipulation tool being less than the determined minimum resolution, interrupt operation of the visual manipulation tool; and
in response to the resolution of the visual manipulation tool being equal or greater than the determined minimum resolution, enable further operation of the visual manipulation tool.

14. The system of claim 13, wherein to interrupt the operation of the visual manipulation tool, the instructions are further executable to prevent the visual manipulation tool from operating below the determined minimum resolution.

15. The system of claim 13, wherein to interrupt the operation of the visual manipulation tool, the instructions are further executable to issue a warning that the visual manipulation tool is operating below the determined minimum resolution.

16. The system of claim 13, wherein the instructions are further executable to:
determine a first minimum dimension by multiplying a first desired image size by the determined minimum resolution;
determine a second minimum dimension perpendicular to the first minimum dimension by multiplying a second desired image size by the determined minimum resolution; and
wherein to interrupt the visual manipulation tool, the instructions are further executable to interrupt the visual manipulation tool if the size of the selection area reaches both the first minimum dimension and the second minimum dimension.

17. A computer program product embodied in a non-transitory computer readable medium comprising computer instructions, wherein the computer instructions are computer-executable to implement:
presenting a graphical user interface that enables manipulating an image via a visual manipulation tool, an area of the visual manipulation tool being changeable by a user such that a change to the area of the visual manipulation tool changes a resolution of the visual manipulation tool, the image including multiple layers each having a different resolution one to another;
determining a minimum resolution for the visual manipulation tool based, at least in part, on one or more of the multiple layers;
monitoring the resolution of the visual manipulation tool responsive to a change in the area of the visual manipulation tool, the monitoring including monitoring a resolution of at least one of the multiple layers;
comparing the monitored resolution of the visual manipulation tool to the determined minimum resolution;
in response to the resolution of the visual manipulation tool being less than the determined minimum resolution, interrupting the operation of the visual manipulation tool; and
in response to the resolution of the visual manipulation tool being equal or greater than the determined minimum resolution, enabling further operation of the visual manipulation tool.

18. The computer program product of claim 17, wherein the interrupting comprises preventing the visual manipulation tool from operating below the determined minimum resolution.

19. The computer program product of claim 17, wherein said interrupting comprises issuing a warning that the visual manipulation tool is operating below the determined minimum resolution.

20. The computer program product of claim 17, wherein the computer instructions are further computer-executable to implement:
determining a first minimum dimension by multiplying a first desired image size by the determined minimum resolution; and
determining a second minimum dimension perpendicular to the first minimum dimension by multiplying a second desired image size by the determined minimum resolution;
wherein interrupting the visual manipulation tool comprises interrupting the visual manipulation tool if the size of the selection reaches one of the first minimum dimension or the second minimum dimension.

21. The computer program product of claim 17, wherein the computer instructions are further computer-executable to implement:
determining a first minimum dimension by multiplying a first desired image size by the determined minimum resolution;
determining a second minimum dimension perpendicular to the first minimum dimension by multiplying a second desired image size by the determined minimum resolution; and
wherein interrupting the visual manipulation tool comprises interrupting the visual manipulation tool if the size of the selection reaches both the first minimum dimension and the second minimum dimension.

* * * * *